Nov. 30, 1948.           A. VANG           2,454,900
METHOD AND MEANS FOR CARBURETING AIR FOR FUEL MIXTURES
Filed July 15, 1943                    3 Sheets-Sheet 1
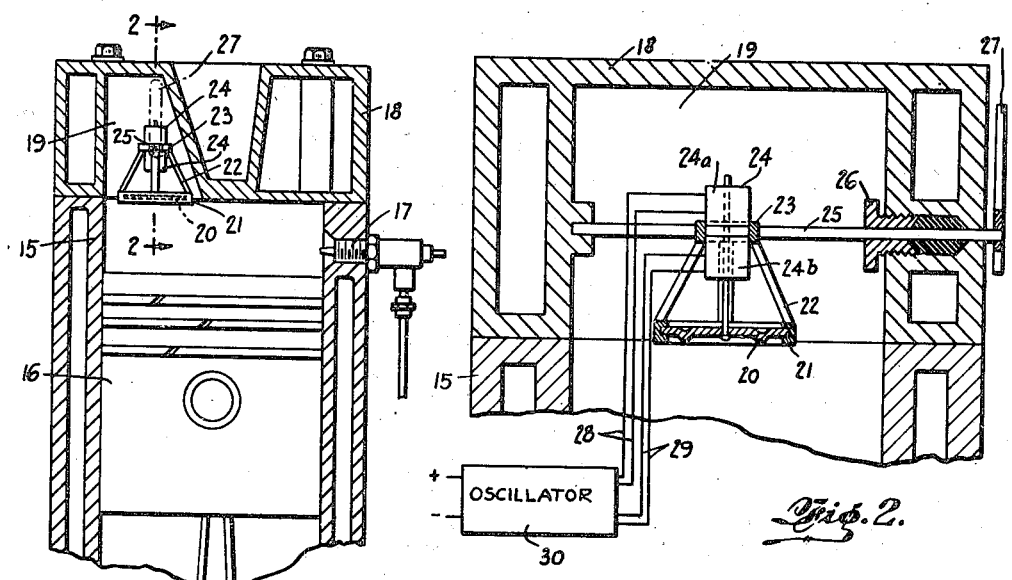
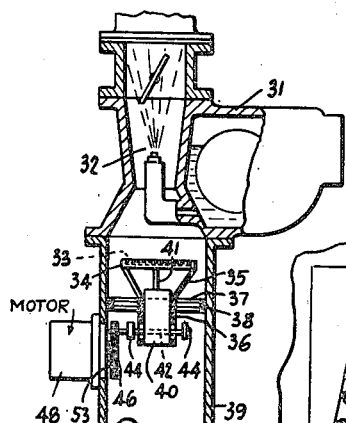
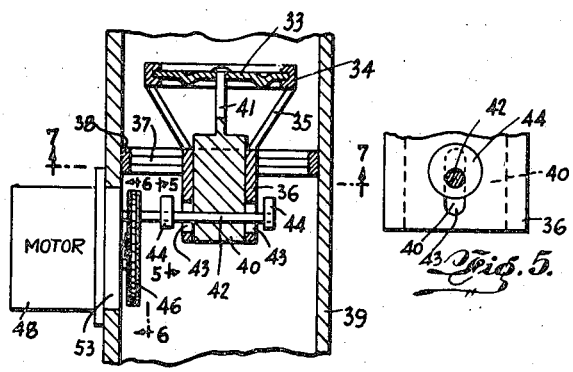
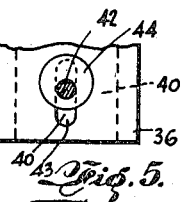
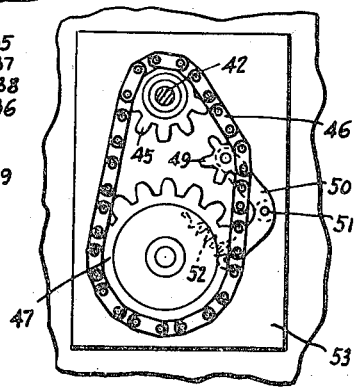
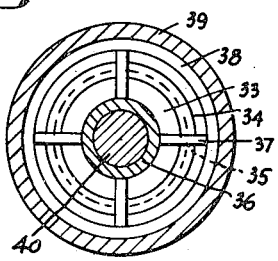
INVENTOR.
ALFRED VANG.
BY
ATTORNEY.

INVENTOR.
ALFRED VANG.
BY
ATTORNEY.

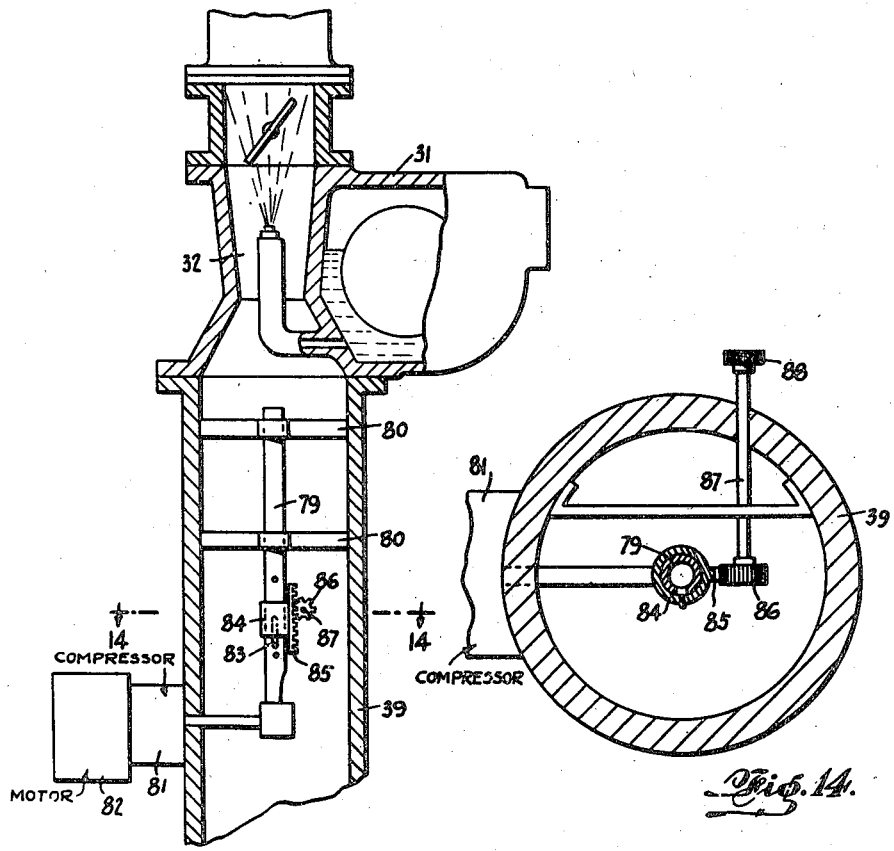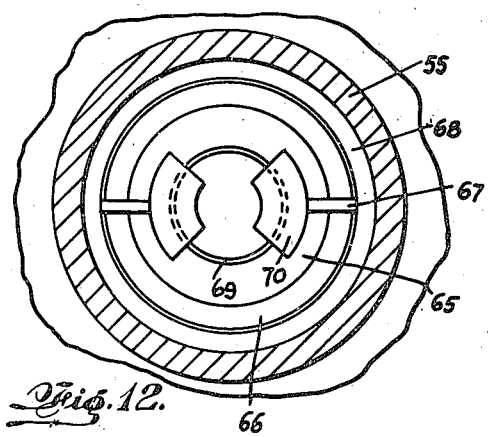

Patented Nov. 30, 1948

2,454,900

UNITED STATES PATENT OFFICE 2,454,900

METHOD AND MEANS FOR CARBURETING AIR FOR FUEL MIXTURES

Alfred Vang, Newark, N. J.

Application July 15, 1943, Serial No. 494,770

9 Claims. (Cl. 123—119)

This invention relates to new and useful improvements in a method and means for carbureting of air in and fuel mixtures of Diesel engines, internal combustion engines and other devices, and constitutes an improvement on my Patent No. 2,414,494.

The said prior application relates to applied vibratory power of a frequency in the supersonic or audible range, to a mixture of gas and fuel, to cause the molecules of the air-fuel mixture to vibrate with such intensity that any large groups of molecules are shaken to pieces and a new orientation of the same obtained, in which all the molecules, both of the air and the fuel are oriented in regular fashion and in spaced relationship to one another. My previous application explained the great benefits obtained by so treating the air-fuel mixture.

The new improvements embodied in this application relate to a method and means for applying the vibratory power, so that not only a breaking down and effective mixing of the molecules take place, but the vibrations induce a rise in the temperature of the mixture and thus a preheating and evaporization of the fuel take place.

In so far as this invention relates to internal combustion engines, or other devices, particularly having Venturi tubes, it is proposed to direct the vibration waves towards and against the reduced section of the Venturi tube for inducing the rise of temperature in the mixture and the preheating and evaporization.

This invention also concerns itself with more efficient means for applying the vibrations to the air-fuel mixture. In the prior invention referred to above, a diaphragm was used which was free at the edges and supported and vibrated at the center. This invention contemplates characterizing the improved means by the fact that the diaphragm is supported at the edges and a vibrating force is applied to or induced against the central portion of the diaphragm. When the vibrating diaphragm is thus supported and operated, it will be found that the principal of "all action must be equal to all reaction," applies resulting in more efficient vibrations. With this construction and operation the inherent natural vibration tendency of the diaphragm itself is made use of.

This invention also concerns itself with additional efficient means for applying vibrations to the air-fuel mixture. Specifically, it is proposed to impart vibrations by a whistling action. It is contemplated to so construct the carburation system or to associate a whistling device therewith for inducing the desired vibrations. It is contemplated that the whistling means may include a wind pipe arranged for resonant control and designed for producing a certain frequency of vibration; a pumping means or other air supply may be used for operating said wind pipe.

With the above and other objects in view, this invention consists of the novel features of construction, combination, and arrangement of parts hereinafter fully described, claimed, and illustrated in the accompanying drawing, forming a part of this application, and in which similar characters of reference indicate corresponding parts in all views, and in which:

Figure 1 is a fragmentary sectional view through one of the cylinders of a Diesel engine equipped with means for carbureting the incoming air in accordance with this invention.

Figure 2 is a fragmentary enlarged vertical sectional view taken on the line 2—2 of Figure 1, with schematic wiring added.

Figure 3 is a fragmentary sectional view through the carburetor of an internal combustion engine equipped with means for carbureting the air, in accordance with this invention.

Figure 4 is a fragmentary enlarged detailed view of the lower portion of Figure 3.

Figure 5 is a fragmentary vertical sectional view taken on the line 5—5 of Figure 4.

Figure 6 is a fragmentary enlarged sectional view taken on the line 6—6 of Figure 4.

Figure 7 is a horizontal sectional view taken on the line 7—7 of Figure 4.

Figure 12 is a horizontal sectional view taken on the line 12—12 of Figure 11.

Figure 13 is a fragmentary sectional view through a carburetor of an internal combustion engine, or the like, equipped with whistling means for assisting in carbureting the air.

Figure 14 is a fragmentary enlarged horizontal sectional view taken on the line 14—14 of Figure 13.

Figure 8:
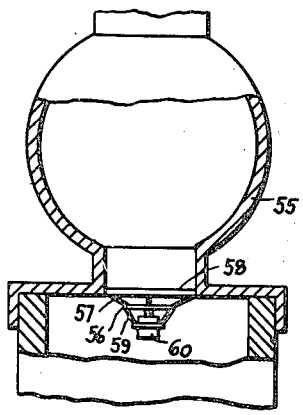
Figure 8 is a fragmentary sectional view through the air bell of an internal combustion engine or other device equipped with means for carbureting the air, in accordance with this invention.

The means for carbureting the air of Diesel engines, in accordance with the form of the invention disclosed in Figures 1 and 2, includes in combination a Diesel engine cylinder 15, having the usual piston 16 operating therein and equipped with the usual fuel ejecting nozzle 17.

The cylinder 15 has a cylinder head 18 formed with a recess 19, in which a diaphragm 20 is supported in a certain way.

The diaphragm 20 is supported by an annular member 21 engaging its edges. This annular member connects with a spider 22, which connects with a ring 23 engaged about the body of a solenoid 24. The ring 23 is supported on a shaft 25, passing through a packing gland 26 and extending to the exterior of the cylinder head 18. A handle or lever 27 is mounted on the extended end of the shaft 25 by which the diaphragm 20 may be aimed in several directions in relation to the path of travel of the air-fuel mixture within the top of the cylinder 15.

The solenoid 24 is provided with adjacent top and bottom sections 24a and 24b, respectively, which are wired up by the circuits 28 and 29 with an oscillator 30. The details of this oscillator will not be given in this specification, since devises of this type are generally known. However, attention is directed to the oscillator and discharge tube disclosed in patents covering my inventions, to wit; Vang No. 2,287,541, issued June 23, 1942, and Vang No. 2,287,544 issued June 23, 1942, which may be used in constructing the oscillator 30. The purpose of the oscillator 30 is to energize the solenoid 24 to cause the diaphragm 20 to vibrate so as to better mix the air-fuel mixture within the cylinder and also assist in the raising of the temperature of the incoming fuel for its better evaporation.

In Figures 3 to 7 another embodiment of my invention is disclosed, in which the improved means for carbureting air and fuel mixtures is applied to a carburetor 31, having a Venturi tube 32. While an up-draft carburetor is disclosed, it should be borne in mind that the invention may be applied to any type and design of carburetor. The improved feature consists in the provision of a diaphragm 33, supported at its edge by an annular member 34, which is supported by a spider 35, connected with a cylindrical member 36, in turn supported by a spider 37, upon a ring 38, mounted within the air tube 39 for the carburetor. A piston 40 is slidably mounted in the cylindrical member 36. This piston has a stem 41 connected with the center of the diaphragm 33. A shaft 42 rotatively passes transversely through the piston 40 and through vertical slots 43 formed in the sides of the cylindrical member 36. A pair of eccentric weights 44 is mounted on said shaft 42.

The shaft 42 is provided with a sprocket wheel 45 engaged by an endless chain 46, which engages on a sprocket wheel 47, mounted on the shaft of a motor 48, indirectly mounted on the side of the air tube 39. An idler sprocket wheel 49 engages the chain 46 and is mounted on a lever 50 pivotally mounted upon a pintle 51 and urged into an operating position by a spring 52, acting between the lever 50 and a mounting plate 53, secured over an opening in the side of the air tube 39 and upon which the motor 48 is also mounted.

The operation of this form of the invention is as follows:

The motor 48 indirectly rotates the shaft 42. The eccentric weights 44 will tend to fly centrifugally in all directions. However, because the shaft 42 passes through the vertically extending elongated slots 43, the weights 44 will be restrained and will merely vibrate the shaft 42 vertically and correspondingly vibrate the piston 40. These vibrations are transmitted to the diaphragm 33. The diaphragm 33 will vibrate the air passing through the reduced section of the Venturi tube 32 for inducing a rise in temperature in the mixture of air and fuel, thus preheating and better carbureting the fuel.

Figure 9:
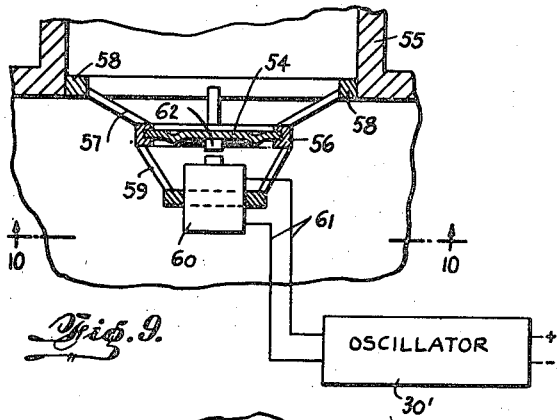
Figure 9 is a fragmentary enlarged detailed sectional view of a portion of Figure 8 with schematic wiring applied.
Figure 10:
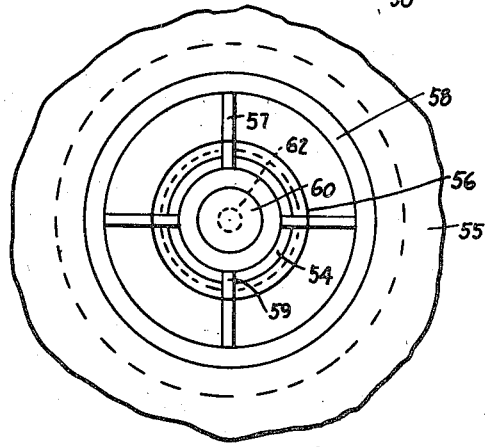
Figure 10 is an elevational view looking in the direction of the line 10—10 of Figure 9.

In Figures 8 to 10 still another form of the invention is disclosed, in which the means for assisting in carbureting air and fuel mixtures is applied to an air bell 55, through which air passes. A diaphragm 54 is aimed through the bell 55. This diaphragm is supported at its edges upon an annular member 56, which in turn is supported by a spider 57, connected to a ring 58, mounted upon the inlet end of the bell 55. The annular member 56 is also connected with another spider 59, which supports a solenoid 60, connected with a circuit 61, which includes an oscillator 30'. An armature 62 is mounted on the center of the diaphragm 54 and is cooperative with the solenoid 60, to be attached by the solenoid when the latter is energized.

In this form of the invention, the oscillator 30' alternately energizes and de-energizes the solenoid 60, which in turn attracts and releases the armature 62. This motion is imparted to the diaphragm 54, which is caused to vibrate, and vibrates the air-fuel mixture in the way previously explained.

It is obvious that changes may be made in the form, construction, and arrangement of the several parts, as shown within the scope of the appended claims, without departing from the spirit of the invention, and I do not, therefore, wish to limit myself to the exact construction and arrangement shown and described herein.

Figure 11:
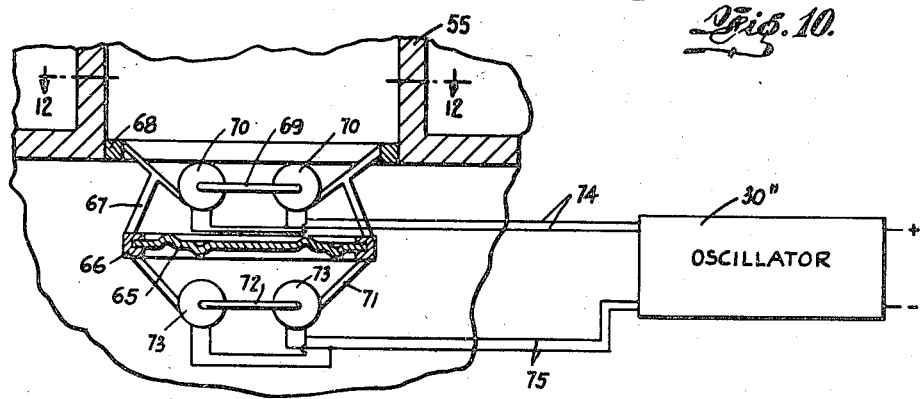
Figure 11 is a fragmentary sectional view similar to Figure 9 but disclosing a modified form of the invention.

In Figures 11 and 12 another form of the invention is disclosed in which the means for assisting in carbureting air includes a diaphragm 65, supported at its edges by an annular member 66, which in turn is supported by a spider 67, connected to a ring 68, mounted in the inlet end of an air bell 55. The spider 67 also supports an annular wire armature 69, located on one side of the diaphragm 65 and provided with a pair of coils 70, mounted on opposite sides. The annular member 66 is provided with an additional spider 71, supporting another annual armature 72, located on the other side of the diaphragm 65. This annular armature 72 is also provided with coils 73, located at diametrically opposite sides thereof. The coils 70 are connected in a circuit 74, connected with an oscillator 30''. The coils 73 are connected with the circuit 75, which is also connected with the oscillator 30''.

In the operation of this form of the invention, the oscillator 30'' alternately energizes the coils 70 and 73, which in turn alternately magnetize the armatures 69 and 72, which again attract and repel the diaphragm 65, inducing the vibrations required for better carbureting air, as previously explained.

In Figures 13 and 14 another form of the invention is disclosed, in which the means for assisting in carbureting air includes whistling means for inducing vibrations of certain characteristics. More specifically, one type of whistling means is disclosed, though it should be borne in mind that other types may be adopted. The whistling means includes a wind pipe 79 supported by several brackets 80, within the air tube 39, to the carburetor. The wind pipe 79 is connected up with an air compressor 81, operated by an electric motor 82. The wind pipe 79 has a pitch control opening 83 and an adjustment sleeve 84 engaging over the opening 83 for controlling the same. A rack 85 is connected with the sleeve 84 and meshes with a pinion 86 on a shaft 87, extending to the exterior of the air tube 39. A knob 88 is mounted on the outer end of the shaft 87. In other respects this form of the invention is identical to the prior forms of this invention.

It is proposed that the pitch of the whistle be adjusted to be in resonance with the Venturi tube of the carburetor. The note may be within or out of the audible range. It is believed that a satisfactory range of vibration would be approximately 4000 cycles per second. While the whistle means is shown operated by compressed air, it should be clearly understood that the natural passage of the air through the carburetor may be used to control the whistling means or other systems may be incorporated.

What I claim as new and desire to secure by Letters Patent of the United States, is:

1. A method for carbureting air and fuel mixtures of internal combustion engines and for other devices, consisting in guiding the mixture to travel in a predetermined path, which includes the reduced section of a Venturi tube, imparting vibrations to the moving mixture at said reduced section, and controlling said vibrations for inducing a rise in temperature in the mixture and thus preheating and better carbureting the mixture.

2. Means for the carburetion of air and fuel mixtures of internal combustion engines comprising guide means for the passage of a mixture of air and fuel vapors, a diaphragm aimed along said passage for the fuel and supported along its edges, and means for imparting vibrations to said diaphragm, said diaphragm being supported in an annular member and said diaphragm being aimed by moving said annular member.

3. Means for the carburetion of air and fuel mixtures of internal combustion engines comprising guide means for the passage of a mixture of air and fuel vapors, a diaphragm aimed along said passage for the fuel and supported along its edges, and means for imparting vibrations to said diaphragm, said diaphragm being supported in an annular member and said diaphragm being aimed by moving said annular member, said annular member being supported by a spider, a ring connected with said spider, a shaft for adjustably holding said ring, and means for moving said shaft.

4. Means for the carbureting of air and fuel mixtures of internal combustion engines comprising guide means for the passage of a mixture of air and fuel vapors, a diaphragm aimed along said passage for the fuel and supported along its edges, and means for imparting vibrations to said diaphragm, said guide means including a Venturi tube having a reduced section, and said diaphragm being aimed at said reduced section.

5. Means for the carbureting of air and fuel mixtures of internal combustion engines comprising guide means for the passage of a mixture of air and fuel vapors, a diaphragm aimed along said passage for the fuel and supported along its edges, and means for imparting vibrations to said diaphragm, said guide means including a Venturi tube having a reduced section, and said diaphragm being aimed at said reduced section; said Venturi tube being a portion of a carburetor.

6. Means for the carbureting of air and fuel mixtures of internal combustion engines comprising guide means for the passage of a mixture of air and fuel vapors, a diaphragm aimed along said passage for the fuel and supported along its edges, and means for imparting vibrations to said diaphragm, said guide means including an air bell, and said diaphragm being mounted across the entrance end of said air bell.

7. In combination, an internal combustion engine having a chamber adapted to contain gas therein, a spider mounted in said chamber and provided with a ring on the outer ends of the legs of said spider, a diaphragm having the peripheral portions thereof mounted on said ring, the spaces between the legs of the spider permitting free circulation of gas adjacent both faces of the diaphragm, and means for vibrating the diaphragm.

8. In combination, an internal combustion engine having a cylinder adapted to contain gas therein, a spider mounted in said cylinder and provided with a ring on the outer ends of the legs of said spider, a diaphragm having the peripheral portions thereof mounted on said ring, the spaces between said legs permitting free circulation of gas adjacent both faces of the diaphragm, means for vibrating the diaphragm, and means for tilting the axis of the diaphragm to direct the sound waves omitted therefrom.

9. In combination, an internal combustion engine having a cylinder adapted to contain gas therein, a spider mounted in said cylinder and provided with a ring on the outer ends of the legs of said spider, a diaphragm having the peripheral portions thereof mounted on said ring, the spaces between said legs permitting free circulation of gas adjacent both faces of the diaphragm, means for vibrating the diaphragm, a transverse shaft rotatably mounted across a portion of the cylinder and passing through the spider, and means exterior of the cylinder for rotating said shaft.

ALFRED VANG.

REFERENCES CITED

The following references are of record in the file of this patent:

UNITED STATES PATENTS

| Number | Name | Date |
|---|---|---|
| 862,856 | Tygard | Aug. 6, 1907 |
| 1,939,302 | Heaney | Dec. 12, 1933 |
| 2,045,404 | Nicholides | June 23, 1936 |
| 2,152,455 | Ballentine | Mar. 28, 1939 |

FOREIGN PATENTS

| Number | Country | Date |
|---|---|---|
| 1,592 | Australia | 1931 |
| 508,582 | England | July 4, 1939 |